(12) United States Patent
Le Costaouec et al.

(10) Patent No.: US 9,309,613 B1
(45) Date of Patent: Apr. 12, 2016

(54) SYSTEM AND METHOD TO FABRICATE HELICAL FABRIC

(71) Applicant: Goodrich Corporation, Charlotte, NC (US)

(72) Inventors: Jean-Francois Le Costaouec, Pueblo West, CO (US); Paul Perea, Pueblo West, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 14/531,493

(22) Filed: Nov. 3, 2014

(51) Int. Cl.
| | |
|---|---|
| *B32B 7/08* | (2006.01) |
| *D04H 1/52* | (2006.01) |
| *D05B 21/00* | (2006.01) |
| *D03D 37/00* | (2006.01) |
| *D05B 23/00* | (2006.01) |
| *D01G 25/00* | (2006.01) |
| *D04H 3/115* | (2012.01) |

(52) U.S. Cl.
CPC . *D05B 23/00* (2013.01); *B32B 7/08* (2013.01); *D01G 25/00* (2013.01); *D03D 37/00* (2013.01); *D04H 1/52* (2013.01); *D05B 21/005* (2013.01)

(58) Field of Classification Search
CPC ............ B32B 7/00; B32B 7/005; B32B 7/04; B32B 7/08; B32B 5/12; B32B 5/26; B32B 38/18; B32B 38/1808; B32B 2250/00; B32B 2262/106; B32B 2305/10; B32B 2305/22; D04H 1/52; D04H 3/08; D04H 3/10; D04H 3/115; D04H 3/13003; B29B 11/16; D05B 21/00; D05B 21/005; D05B 23/00; D05B 23/006; D01G 25/00; D03D 37/00; D03D 41/004; D03D 2700/16; D03D 3/00
See application file for complete search history.

(56) References Cited

U.S. PATENT DOCUMENTS

| | | | | |
|---|---|---|---|---|
| 4,977,933 | A * | 12/1990 | Brais ...................... | D03D 37/00 139/15 |
| 5,546,880 | A * | 8/1996 | Ronyak ................. | B29C 70/228 112/420 |
| 5,662,855 | A * | 9/1997 | Liew ..................... | D04H 13/003 156/184 |
| 6,319,348 | B1 * | 11/2001 | Olry ....................... | B29C 70/228 156/148 |
| 7,185,404 | B2 * | 3/2007 | Delecroix .............. | D04H 1/498 28/101 |
| 7,503,273 | B2 * | 3/2009 | Beneventi .............. | B29C 70/48 112/440 |
| 9,045,846 | B2 * | 6/2015 | Lecostaouec ............ | D03D 1/00 |
| 2005/0042410 | A1 * | 2/2005 | Sakonjo ................. | B29B 11/16 428/66.6 |
| 2011/0275266 | A1 * | 11/2011 | Lecostaouec ........... | B29B 11/16 442/240 |

* cited by examiner

*Primary Examiner* — Ismael Izaguirre
(74) *Attorney, Agent, or Firm* — Snell & Wilmer L.L.P.

(57) ABSTRACT

A substantially continuous sewn helical fabric circular loom bed plate turntable system is described herein. The circular loom bed plate turntable may comprise a positive lay down delivery station, a rotating table comprising a plurality of pass-through grooves, a robotic sewing head comprising a needle configured to pass through a first subset of the plurality of pass-through grooves, and a fabric packaging station. The circular loom bed may comprise a positive lay down delivery station, a first semi-circular conveying system, a sewing zone comprising a robotic sewing head, a second semi-circular conveying system, and a fabric packaging station.

15 Claims, 8 Drawing Sheets

US 9,309,613 B1

SYSTEM AND METHOD TO FABRICATE HELICAL FABRIC

FIELD

This disclosure generally relates to transport, positioning and forming of a continuous helical fabric.

BACKGROUND

Carbon/carbon ("C/C") parts are employed in various industries. An exemplary use for C/C parts includes using them as friction disks such as aircraft brake disks, race car brake disks, clutch disks, and the like. C/C brake disks are especially useful in such applications because of the superior high temperature characteristics of C/C material. In particular, the C/C material used in C/C parts is a good conductor of heat and thus is able to dissipate heat away from the braking surfaces that is generated in response to braking C/C material is also highly resistant to heat damage, and is thus capable of sustaining friction between brake surfaces during severe braking, without a significant reduction in the friction coefficient or mechanical failure. A circular needle loom may be utilized to form a circular preform, for example, for use in creating net shape carbon brake disks.

SUMMARY

According to various embodiments, a circular loom bed plate turntable system is disclosed. The circular loom bed plate turntable system may comprise a positive lay down delivery station, a rotating table comprising a plurality of pass-through grooves, a robotic sewing head comprising a needle configured to pass through a first subset of the plurality of pass-through grooves, and a fabric packaging station is described herein. The fabric packaging station may be configured to remove a substantially continuous sewn helical fabric from the circular loom bed plate turntable.

According to various embodiments, a circular loom bed may comprise a positive lay down delivery station, a first semi-circular conveying system, a sewing zone comprising a robotic sewing head, a second semi-circular conveying system, and a fabric packaging station is described herein. The fabric packaging station is configured to remove a substantially continuous sewn helical fabric from the circular loom bed.

BRIEF DESCRIPTION OF THE DRAWINGS

The present disclosure may be better understood with reference to the following drawing figures and description. Non-limiting and non-exhaustive descriptions are described with reference to the following drawing figures. The components in the figures are not necessarily to scale, emphasis instead being placed upon illustrating principles. In the figures, like referenced numerals may refer to like parts throughout the different figures unless otherwise specified. Further, because the disclosed fibers, tows and yarns (and their orientations) in practice are very small and closely packed, the figures herein may show exaggerated and/or idealized fiber width and spacing in order to more clearly illustrate the fiber orientations and shape of the bundles.

DETAILED DESCRIPTION

Figure 1:
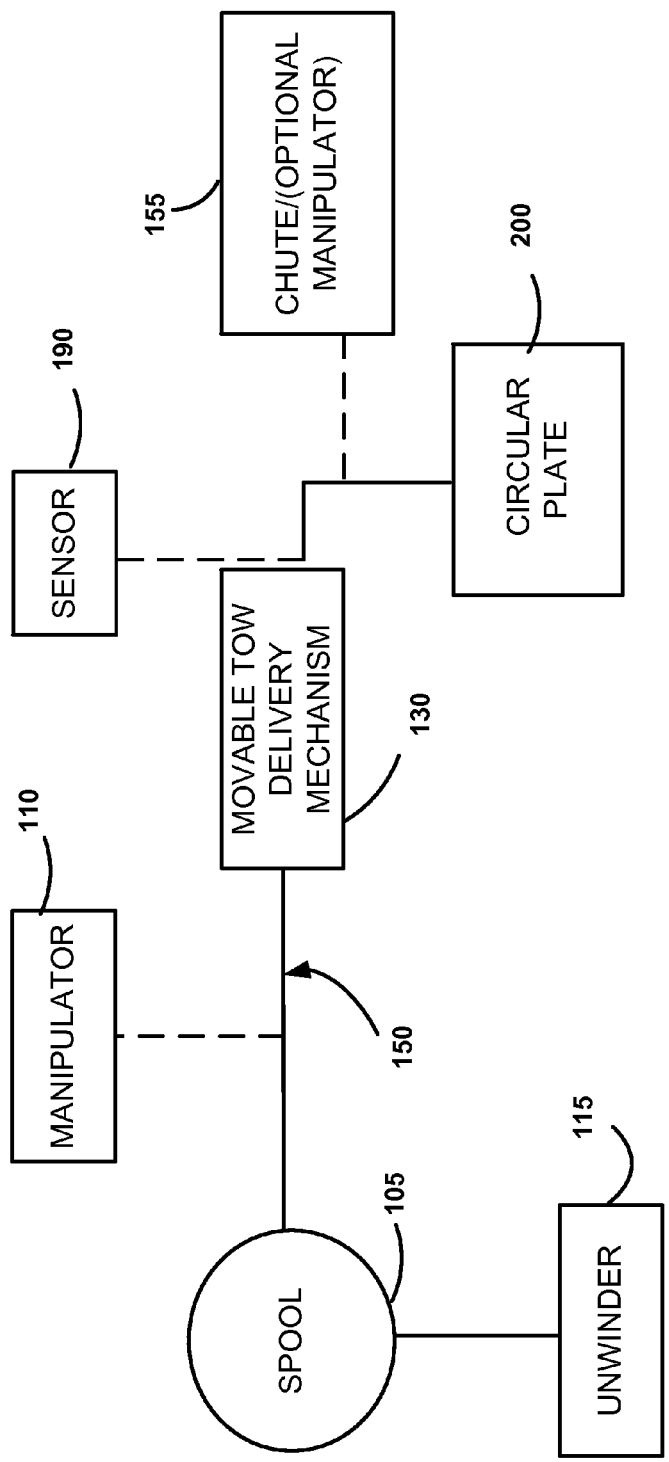
FIG. 1 illustrates a positive tow delivery, substantially continuous helical fabric forming system according to various embodiments.

The detailed description of various embodiments herein makes reference to the accompanying drawing figures, which show various embodiments and implementations thereof by way of illustration and its best mode, and not of limitation. While these embodiments are described in sufficient detail to enable those skilled in the art to practice the embodiments, it should be understood that other embodiments may be realized and that logical and mechanical changes may be made without departing from the spirit and scope of the disclosure. Furthermore, any reference to singular includes plural embodiments, and any reference to more than one component or step may include a singular embodiment or step.

Also, any reference to attached, fixed, connected or the like may include permanent, removable, temporary, partial, full and/or any other possible attachment option. Additionally, any reference to without contact (or similar phrases) may also include reduced contact or minimal contact. Finally, though the various embodiments discussed herein may be carried out in the context of an aircraft, it should be understood that systems and methods disclosed herein may be incorporated into anything needing a brake or having a wheel, or into any vehicle such as, for example, an aircraft, a train, a bus, an automobile and the like.

C/C material is generally formed by utilizing continuous oxidized polyacrylonitrile (PAN) fibers, referred to as "OPF" fibers. Such OPF fibers are the precursors of carbonized PAN fibers and are used to fabricate a preformed shape using a needle punching process. OPF fibers are layered in a selected orientation into a preform of a selected geometry. Two or more layers of fibers may be layered onto a support and are then needled together simultaneously or in a series of needling steps. This process interconnects the horizontal fibers with a third direction (also called the z-direction). The fibers extending into the third direction are also called z-fibers. This needling process may involve driving a multitude of barbed needles into the fibrous layers to displace a portion of the horizontal fibers into the z-direction. Various embodiments of the disclosure make use of carbonized carbon fibers to prepare a needled preform.

As used herein, the terms "tow" and "cable" are used to refer to one or more strands of substantially continuous filaments. Thus, a "tow" or "cable" may refer to a plurality of strands of substantially continuous filaments or a single strand of substantially continuous filament. "Fiber bundle" may refer to a tow of substantially continuous filaments. "Fiber bundle" may also refer to various formats of narrow strips of stretch broken fibers. "Spiral" fabric may also be referred to herein as "helical" fabric. A "textile" may be referred to as a "fabric" or a "tape."

As used herein, the term "ribbon" is used to refer to a closely packed bundle of continuous filaments and discontinuous filaments like stretch broken fibers generally delivered from a spool. A "span" as used herein may be a length of ribbon and/or tow. As used herein, the term "yarn" is used to refer to a strand of substantially continuous fibers or staple fibers or blends of these, thus the term "yarn" encompasses tow and cable. As used herein, the unit "K" represents "thousand." Thus, a 1K tow means a tow comprising about 1,000 strands of substantially continuous filaments. For example, a "heavy tow" may comprise about 48,000 (48K) textile fibers in a single tow, whereas a "medium tow" may comprise about 24,000 (24K) textile fibers within a single tow whereas a "lighter tow" may comprise about 6,000 (6K) textile fibers within a single tow. Fewer or greater amounts of textile fibers may be used per cable in various embodiments. In various embodiments disclosed herein, fabrics in accordance with various embodiments may comprise tows of from about 0.1K to about 100K, and, in various embodiments, heavier tows. As is understood, "warp" fibers are fibers that lie in the "warp" direction in the textile, i.e., along the length of the textile. "Weft" fibers are fibers that lie in the "weft" direction in the textile, i.e., along the width of the textile. Traditionally, weft describes a tow oriented at 90 degrees from the warp direction. For simplification, weft also describes here any tow oriented at some angle with the warp (or circumferential fibers) such as bias fiber set at 45 degrees±15 degrees with respect to the circumferential direction. Warp fibers may be described as being spaced apart with respect to the weft direction (i.e., spaced apart between the outer diameter (OD) and inner diameter (ID) of the textile). Similarly, the weft tows may be described as being spaced apart with respect to the warp direction.

In various embodiments, any combination of warp and weft tow size may be used. For example, 48 k warp tows may be used with 24 k weft tows. Also for example, other combinations of warp tows to weft tows include: 48K:12K, 24K:24K, and 24K:12K. A ribbon/carbon fiber tow may be wrapped around a round spool for ease of transport and feeding into a weaving apparatus for fabricating a fabric which is used in a subsequent preforming process using needle punching. The ribbon on the spool comprises a generally closed packed rectangular cross sectional shape. A length of ribbon may be delivered from the spool to the weaving apparatus. In response to being manipulated under tension by a weaving apparatus, the generally rectangular shaped cross section of the ribbon changes to a generally oval shaped cross section. This oval shaped cross section is undesirable and a preferred approach is to spread the ribbon in the Y direction to increase the width, W, of the ribbon to increase coverage and reduce fiber volume. The ribbon may be spread mechanically through passage over and under specially shaped bars. In the alternative, the ribbon may be spread via vacuum suction or through ultrasonic vibration. Alternatively, it may be advantageous to provide bulk to the tow through the use of an air jet, thus re-orienting a portion of the fibers and providing greater volume to the tow.

Fabrication of dry fabrics where the fiber tows retain their original flat ribbon shape (and rectangular cross-sectional shape) or are further spread beyond their as manufactured width (but maintain a rectangular cross-sectional shape) or are volumized is desirable for maximizing homogeneity of final fiber reinforced composites. The use of flat spread tows tends to minimize the amount of crimp in the manufactured fabrics and allows the fabrication of low areal weight fabric with full fiber coverage using larger tows such as about 12,000 to about 50,000 filament tows. Furthermore, in some applications, like the manufacturing of C/C friction disks where the dry fabric may be subsequently transformed into a 3D fiber structure, such as through a needle punching/needling process, looser spread tows and/or volumized tows are more conducive to the fabrication of a textile preform with a homogeneous fiber distribution within each horizontal plane of the textile.

As previously mentioned, commercial carbon fiber tows are typically packaged in the form of a flat ribbon onto spools, such as cardboard spools. However, during handling under tension through the various components of a loom, the dry tows have a tendency to "neck down" or reduce in cross sectional area and take a rounded or oval shape, when viewed along a cross section. Fiber coverage of these fabrics at low areal weights is very poor. A preform needled with such a fabric made of tighter rounded tows exhibits more distinct tows of higher fiber volume separated by larger gaps. These high fiber volume fiber bundles separated by larger gaps results in poor coverage and layers with locally higher density in finished composite product.

During fabrication of annular preforms, such as those used in aircraft brake needled preforms, it is desirable, in addition to fiber orientations, to control the shape and the fiber volume of the carbon fiber tows during the various textile steps preceding the needle-punching step. Looser/bulkier spread tows are more conducive to the fabrication of a textile brake preform exhibiting a homogeneous fiber distribution within each horizontal plane of the textile. Furthermore, the use of flat spread tows allows the fabrication of low areal weight fabrics with full fiber coverage using larger tows such as 12K to 50K tows.

Potential feed textiles used in fabrication of annular needled preforms such as continuous helical fabrics are typically fabricated using take-off systems to pull the fabric and tows through the weaving loom. This approach imparts tension on the ribbons and forces the bundle of tows from their original as-supplied ribbon shapes into rounded, packed tows having a generally circular and/or oblong cross-section. These fabrics with localized high fiber volume fiber bundles require a high level of needling to fabricate a carbon preform with a low fiber volume, such as for the manufacturing of carbon-carbon friction disks. According to various embodiments, and with reference to FIG. 1, a device may be utilized to deliver a substantially continuous feed of a length of tow/fiber bundle 150 to a lay down surface, such as a circular loom bed plate turntable 200. The circular loom bed plate turntable 200 may be part of a larger circular loom bed plate turntable system. The device may be a device configured to impart little to no tension on the fiber bundle 150 as the fiber bundle 150 is delivered from a ribbon and or fabric bundle supply, such as a spool 105, to the circular loom bed plate turntable 200. According to various embodiments, the device comprises an unwinder 115 configured to maintain constant adjustable minimum tension on the tow as the tow is positively driven with tow delivery mechanism 130 placed between a delivery location and the spool 105. A sensor 190 measuring linear speed of the tow within the delivery mechanism communicates with the unwinder 115. The tension between the unwinder 115 and the tow delivery mechanism 130 is low. Stated another way, the tension between the tow delivery mechanism 130 and the tow placement surface is extremely low as tow delivery mechanism 130 pushes the fiber bundle 150 forward to a delivery location, such as a circular loom bed plate turntable 200.

The tow delivery mechanism 130 may comprise pinch rollers with a motor driving at least one of the rollers. Each tow delivery mechanism may transport one or several tows. The spatial location of the tow delivery mechanism 130 above the bed plate turntable 200 may be automatically adjusted to achieve targeted fiber orientation within the preform.

In their preform state, fiber reinforced composites prepared with carbon fiber tows or ceramic fiber tows typically exhibit a wide range of porosity with the finer porosity not readily accessible which frequently translates into heterogeneous densification of the composites. As-received carbon or ceramic fiber tows exhibit very high fiber volume with short fiber to fiber distances. Packing of the fibers within the tow may be maintained during the typical textile operations which precede the preforming step such as weaving and fiber placement.

During the textile process, usually done under tension, re-arrangement of the as-received ribbon shape tow into a thicker, more rounded shape further aggravates the situation. In the case of preforming using needle-punching, the heterogeneous fiber distribution is generally not satisfying to improve the action of the barbed needles. It is proposed to increase the fiber to fiber distance within the tow using a manipulator 110, such as a high velocity air flow.

Figure 2:
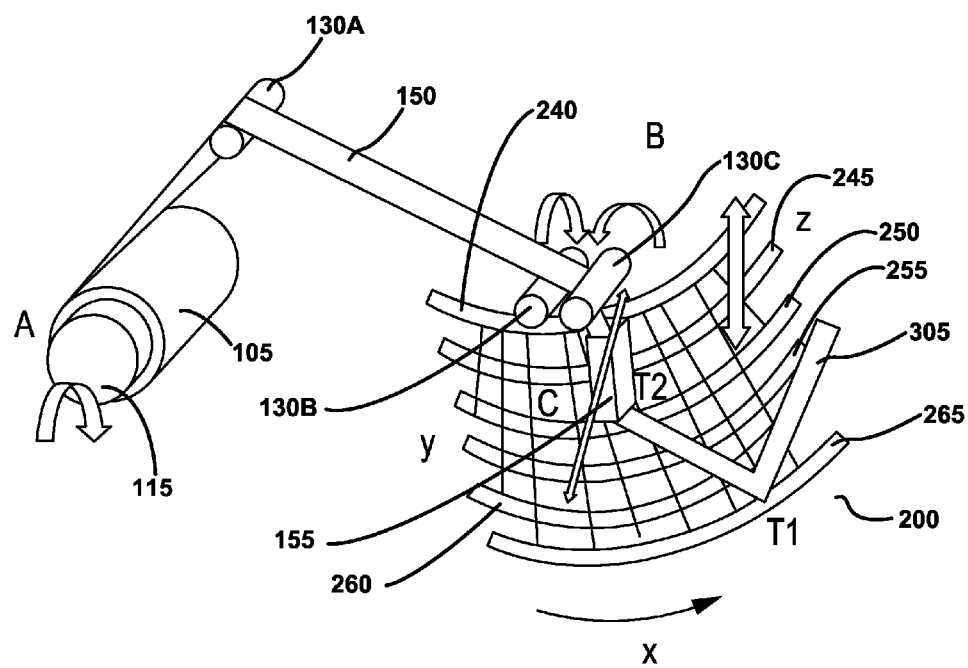
FIG. 2 illustrates a top view of a tow delivery system placed above circular fiber placement loom according to various embodiments.

According to various embodiments, and with reference to FIG. 1, between the fiber bundle ribbon supply, such as fiber bundle ribbon supply A as depicted in FIG. 2, that includes spool 105, and the delivery location, a manipulator 110 may be interposed. The manipulator 110 may assist with achieving the fiber volume and/or areal weight desired. The manipulator 110 may agitate, disturb, loosen, and/or spread the fiber bundle 150 into a desired fiber volume. The manipulator 110 may be a physical apparatus, such as a spreader bar. The manipulator 110 may be jets of gas, such as compressed air via a compressed air feed, configured to disturb the orientation of the fibers within the fiber bundle 150. The manipulator 110 may be an ultrasonic process to disrupt the orientation of fibers of the fiber bundle 150. A chute 155 may be interposed between the tow delivery mechanism 130 and the circular loom bed plate turntable 200. The chute 155 may take the form of a chamber where additional manipulation of the tow may be conducted. For example, compressed air may be used to manipulate the tow instead of at location of manipulator 110 or in addition to location of manipulator 110. The chute 155 may take the form of a slide or chamber which function is to guide fiber bundle 150 to final lay-up condition.

With reference to FIG. 2, an example of tow placement with circumferential orientations of fiber bundles 245, 250, 255, 265 is first laid down on the turntable 200 of the circular fabric loom. According to various embodiments, an unwinder 115 is configured to maintain constant adjustable minimum tension on the fiber bundle 150 as the fiber bundle 150 is positively driven with tow delivery mechanism 130, such as tow delivery mechanism 130A, placed between a delivery location and the spool 105. Moveable tow delivery assembly B+C comprising two positive tow delivery mechanisms 130B, 130C and chute 155 may be positioned at a selected angle with the general rotational direction X of the turntable. The tow delivery assembly is automatically moved in the Y direction and tow section T1, T2 is deposited on the unidirectional (UD) fabric. For instance, the V shaped patterns 305, 310, 315, and 320 of fiber bundles is achieved by the coordination of the movement of tow delivery assembly B+C along the Y direction with the rotational movement of circular loom bed plate turntable 200 in either direction clockwise or counter-clockwise.

Figure 3:
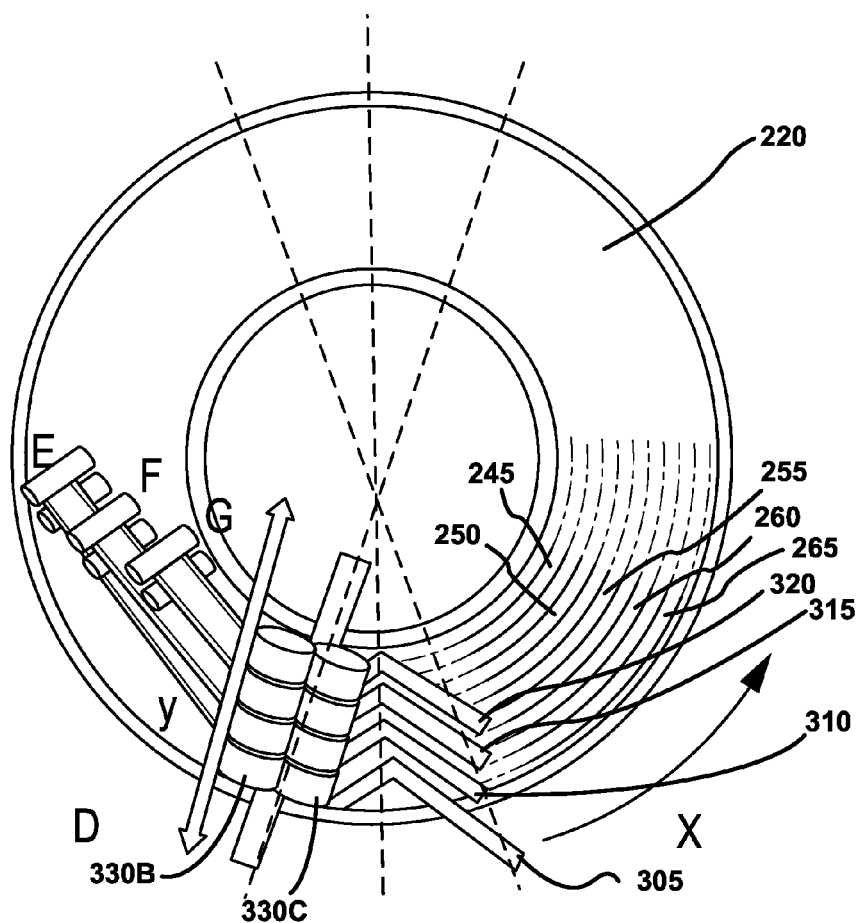
FIG. 3 illustrates a side view of a circular fiber placement loom according to various embodiments.

In various embodiments, and with reference to FIG. 3, multiple fiber bundle 150 feeders may simultaneously lay down bundles of tows on circular loom bed plate turntable 200. A plurality of stationary tow delivery systems E, F, G supporting conical pinch rollers may be used to lay down circumferential fiber bundles 240, 245, 250, 255, 260, 265 (See also FIG. 2). Each set of positive tow delivery mechanisms 130 may deliver one or several fiber bundles. Speed of tow bundle delivery is coordinated with the rotational speed of turntable. Patterns 305, 310, 315, and 320 are achieved through entire width of bed plate at once by coordinating movement of a plate 220 of the circular loom bed plate turntable 200 with movement along Y of a plurality of tow delivery mechanisms mounted on a common support. In this way very, high fiber bundle placement speed may be achieved.

For instance, with brief reference to FIG. 3, plate 220 of the circular loom bed plate turntable 200 may work in coordinated movement with the plurality of fiber bundle 150 feeders, such as tow delivery mechanisms 330B and 330C, in close proximity.

According to various embodiments, as fiber bundle 150, is received in ribbon form, with in-line manipulation of the fiber bundles 150 (spreading or spreading and volumization with manipulators 110) during their transport to points of delivery into the circular loom bed plate turntable 200 positive transport is achieved. The automated placement of these points of deliveries to lay down the fiber bundles 150 at selected orientations in the area correspond to the feeding zone of the circular loom bed plate turntable 200.

Control of the fiber bundle 150 transport is accomplished by using positive tow delivery mechanism 130. The positive tow delivery mechanism 130 may be a "feed device" configured to direct the path of the fiber bundle. Positive tow delivery mechanism 130 may be any shape; however, in accordance with various embodiments the tow delivery mechanism 130 may be cylindrical and/or conical and tow delivery mechanism 130 is moveable to selected positions at selected speeds. The positive tow delivery mechanism 130 may communicate with an electronic unwinder 115 that allows the un-winding and transport of fiber bundle 150 under minimum, controlled tension. Spreading and bulking of a fiber bundle 150 may be conducted using a manipulator 110, such as by using specially curved shaped bars or/and air jets and/or ultrasonic energy and/or a combination of the above methods.

This method may be used to lay down a desired preform fiber orientation directly on the circular needle punching loom, such as on a circular loom bed plate turntable 200. For instance, a continuous helical fabric may be formed through this lay down method. It may be desirable to manipulate the tows and/or fiber bundle 150 prior to assembling the fiber bundles 150 into the continuous helical fabric. Also, it may be desirable to maintain the imparted tow configuration during the fabrication of the fabric. Tow manipulation may include mechanical spreading and/or volumization such as via an air jet. Volumization may improve the densification uniformity of the resultant preform. Existing fabric forming processes typically require tension on the length of tows which may reduce the beneficial impact of the volumization process, depending on the applied tension level. Disclosed herein is a method and system 501 to form a continuous helical fabric where the tows maintain specific desired features.

Figure 4:
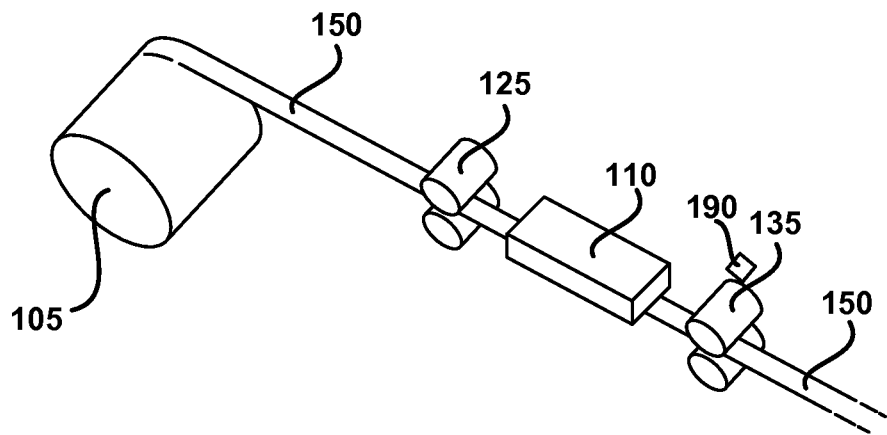
FIG. 4 illustrates a manipulator interposed between a spool and a delivery location according to various embodiments.

According to various embodiments, single tow volumizing: FIG. 4 depicts an example of a set-up for volumizing a single fiber bundle 150. The fiber bundle 150 is pulled from its original spool 105 without imparting twist, manipulated with a manipulator 110 and fed towards online textile forming process. It is desirable to create some amount of fiber bundle 150 overfeed inside the manipulator 110 to allow the fibers of the fiber bundle 150 to be in a relaxed state and react to the effects of the manipulator 110. This overfeed may be achieved by positive feed pinch rollers deposed on either side of the tow around the manipulator 110. For instance, as depicted in FIG. 4, a first assembly 125, such as a positive feed pinch roller assembly may flank the entrance to the manipulator 110 and be configured to insert the fiber bundle 150 into the manipulator 110. A second assembly 135, such as a positive feed pinch roller assembly may push the fiber bundle 150 to exit the manipulator 110. The operation of assemblies 125 and 135 may be synchronized and/or operated by a controller. The first or second assembly 125,135 may be coupled to a sensor 190 to control operation thereof.

Figure 5:
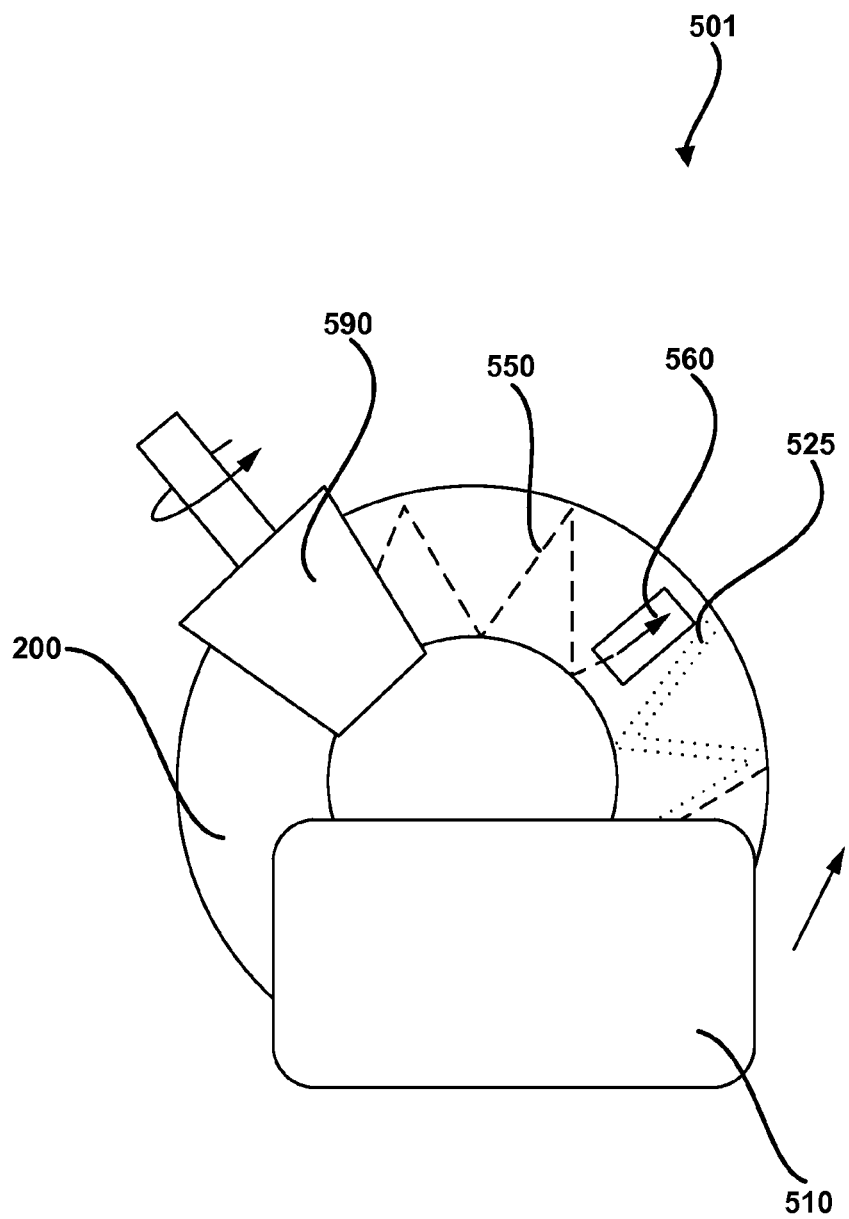
FIG. 5 illustrates a substantially continuous helical fabric forming system having a plurality of grooves in the circular fiber placement loom turntable and a sewing head according to various embodiments.

One or several mobile sewing heads may be positioned down-stream of the fiber lay down station 510 to secure various loose tows, as shown in FIG. 5. Fiber lay down station 510 may be a positive fiber lay down station 510. The assembled fiber layers using stitches (such as a layers of a helical fabric stacked upon itself) of a preform are subsequently packaged for further use by, for example, wrapping the fabric on a conical spool 590 positioned near, such as above, the circular loom bed plate turntable 200. Conical spool 590 may be a fabric packaging station to receive the self-standing fabric. Robotic sewing heads 560 using two needles working from the top of the fabric may be well suited for the various embodiments described herein. According to various embodiments, robotic sewing heads 560 may function with one needle.

According to various embodiments and with continued reference to FIG. 5, the circular loom bed plate turntable 200 is equipped with grooves 525 to accommodate the penetration of the needles below and/or through the fiber layers. Grooves 525 may be any desired dimension, however; it should be appreciated that grooves 525 pass through the surface of the circular loom bed plate turntable 200 to accommodate at least a portion of the one or more needle passing through the surface of the circular loom bed plate turntable 200. In this way, grooves 525 may be pass-through grooves.

It may be desirable to minimize the number of stitching lines and/or stitches 550 in the fiber layers to allow maximum fiber movement during a subsequent needle punching step. The stitches 550 may provide sufficient integrity to the fabric during the winding and unwinding steps, such as unwinding from conical spool 590. According to various embodiments, the assembly pattern of the tows is generally oriented in circumferential and pseudo bias orientations such as the generally "V" shaped lines as shown in FIG. 3. Alternate fiber architecture may additionally include radial fibers. The pattern of the grooves 525 may be configured to mirror the orientations of the tow lay down pattern, such as disposed along the edges of the "V" shapes. According to various embodiments, the pattern of the grooves 525 may be configured to be a zig-zag pattern as shown in FIG. 5. Several sewing heads 560 may be used to speed up the sewing steps. For example, a given head 560 with a limited path of travel may be configured to apply a portion of the stitch pattern (stitches 550) and a second head may be configured to apply the remaining portion of the stitch pattern (stitches 550). In various embodiments, a commercial robotic sewing head capable of forming a blind stitch may be used. In this way, the generally curved needle does not penetrate below the bottom surface of a layer. As such, the circular loom bed plate turntable 200 may be grooveless in accordance with various embodiments.

Figure 6:
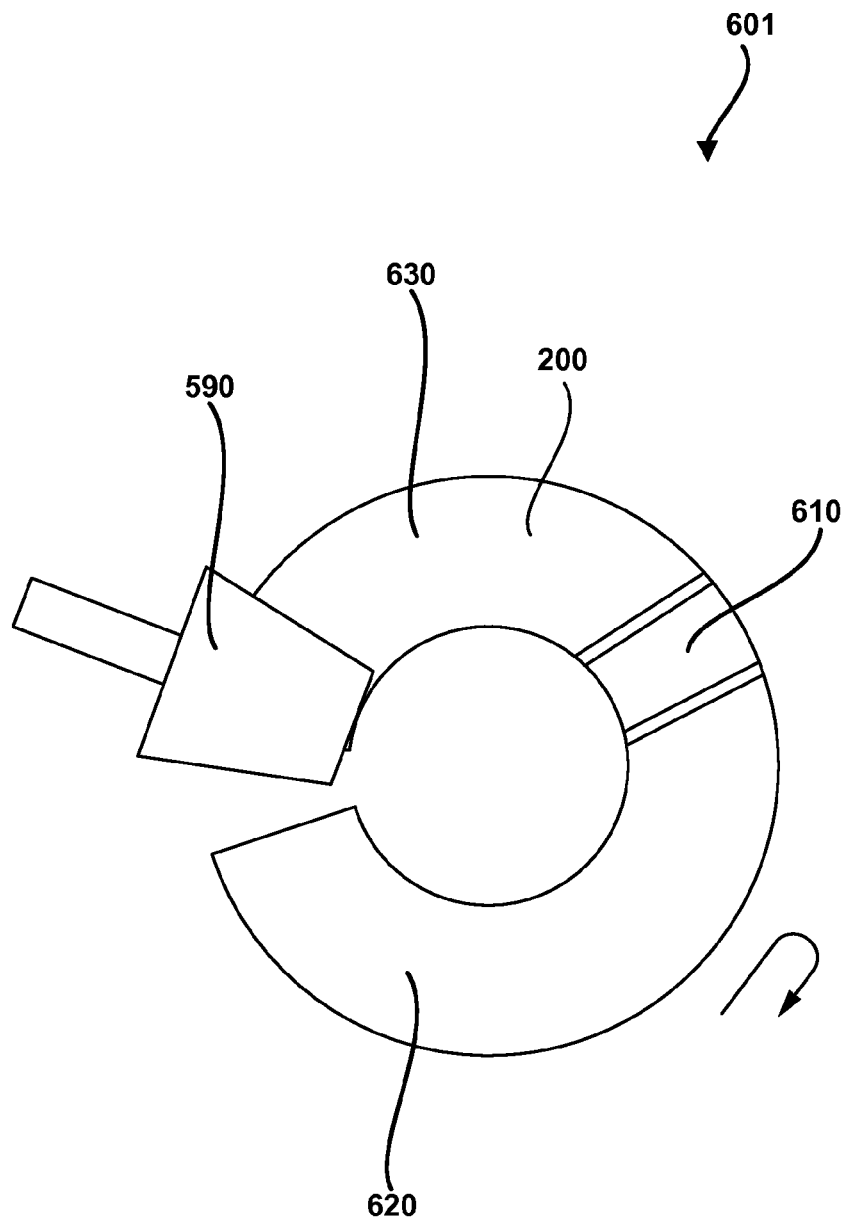
FIG. 6 illustrates a substantially continuous helical fabric forming system having a plurality of semicircular conveying systems according to various embodiments.

According to various embodiments and with reference to FIG. 6, the circular loom bed plate turntable 200 is equipped with traditional sewing heads in sewing zone 610. System 601 is an example of a table configuration to accommodate the lower components which interface with the needle of traditional sewing machine.

The path of the fibers and fabric are created with two separate semi-circular conveying systems, such as a first semi-circular conveying system 620 and a second semi-circular conveying system 630. The two sections, e.g., first semi-circular conveying system 620 and second semi-circular conveying system 630, may be positioned on either side of the sewing zone 610 along the face, e.g., top surface, of the circular loom bed plate turntable 200. Stated another way, the sewing zone 610 is disposed between the first semi-circular conveying system 620 and the second semi-circular conveying system 630. In this way, the first semi-circular conveying system 620 and the second semi-circular conveying system 630 may each comprise a semi-circular shaped conveying belt which partially covers a top and a bottom surface of the circular loom bed (e.g., circular loom bed plate turntable 200). Thus, a continuous helical fabric may be formed. The controlled low tension of the fiber lay down system may maintain the features imparted to the tow. The sewing approach for assembling the tow layers allows minimizing the number of stitch lines (stitches 550) in each layer, thus allowing more free movement of the fibers during a subsequent needle punching step. In that regard, in various embodiments, systems and methods disclosed herein are amenable to a fully automated system for economically preparing a helical fabric. The method also enables the introduction of sewn features to strengthen the inner and outer edges of the fabric, which in turn enable the use of the edges to carry the fabric and the needled preform during the fabrication of the preform from the helical fabric within a smooth bed plate needle punching loom.

Figure 7:
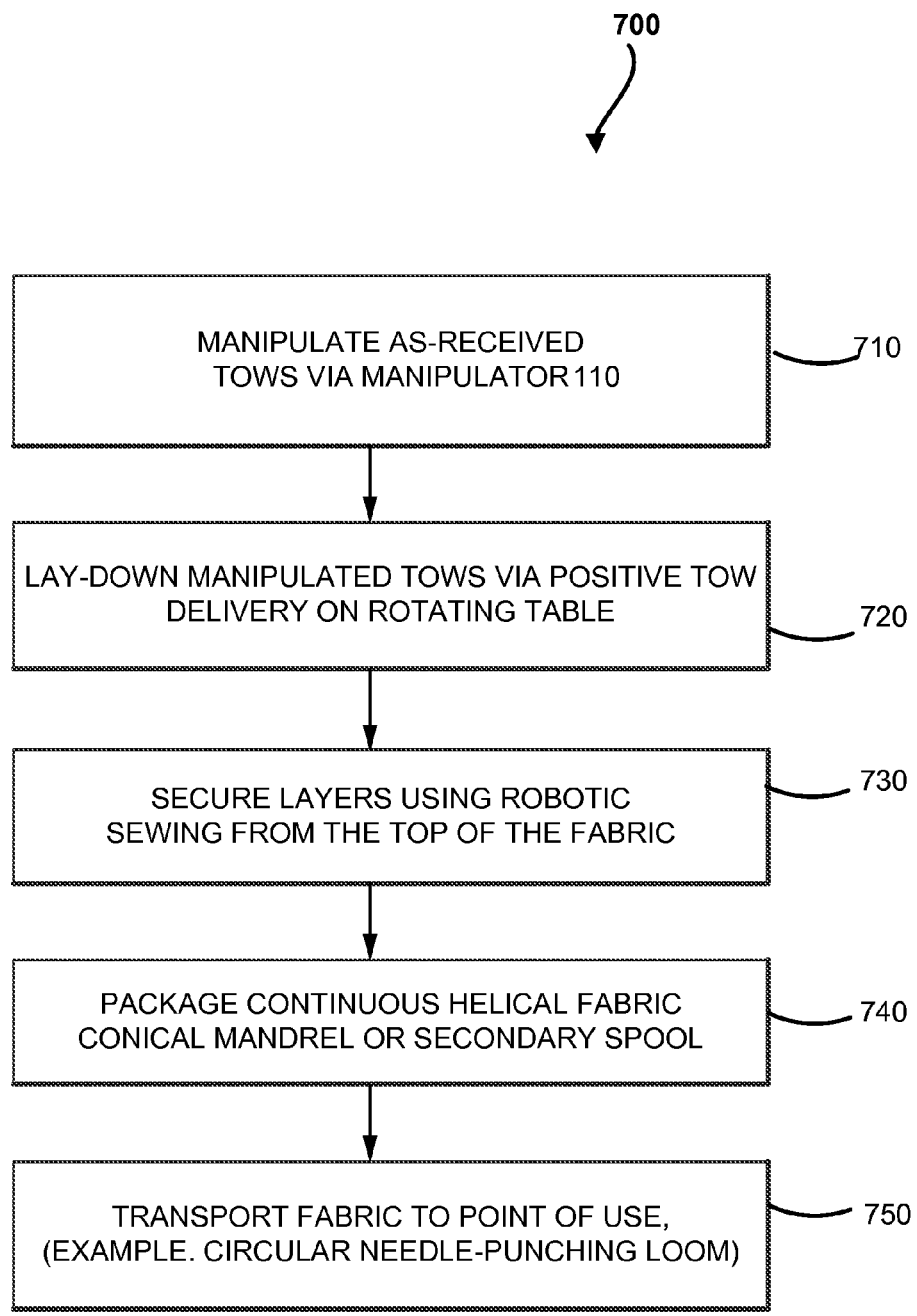
FIG. 7 illustrates a method of forming substantially continuous helical fabric according to various embodiments.

According to various embodiments and with reference to FIG. 7, a method 700 for fabricating a continuous helical fabric is disclosed. The tows from an as-received spool, such as a spool of tows received from a manufacturer, may be manipulated by a manipulator 110 (step 710). The manipulated tows may be laid down via positive tow delivery on a rotating circular loom bed plate turntable 200 (step 720). The layers of positively delivered tows may be secured via robotic sewing from the top of the fabric (step 730). The substantially continuous sewn helical fabric may be packaged on a conical mandrel or other secondary spool (step 740). The substantially continuous sewn helical fabric may be transported to a point of use, such as a circular needle-punching loom 200 (step 750).

Figure 8:
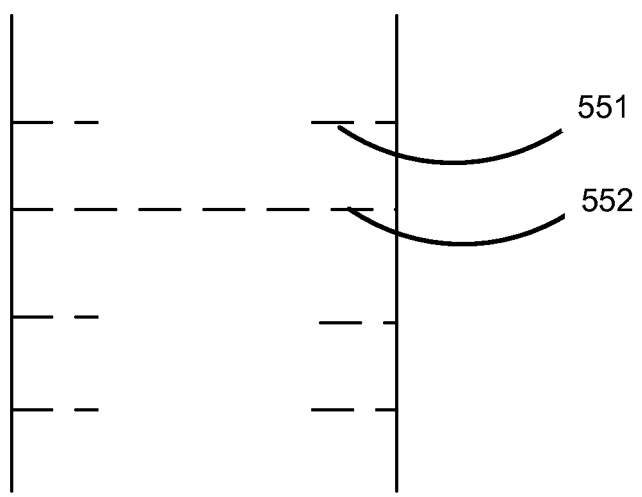
FIG. 8 illustrates sewn edge features of the substantially continuous helical fabric according to various embodiments.

According to various embodiments and with reference to FIG. 8, sturdy inner and outer fabric edges may aid in the transport the fabric and the resulting preform within a circular needle punching loom where the edges are used to transport the textile. In order to strengthen the edges, sewn features may be added to the continuous helical fabric. For instance, sewn features may be added along the helical fabric edges. For example as shown in FIG. 8, short radial stitch lines 551 along the inner and outer circumferences and/or possibly full radial lines 552 during the general sewing step provide a mechanism to carry the fabric in the circular needle loom 50. Stated another way, the stitch lines of the robotic sewing head comprise noncontiguous radial stitch lines along an inner circumference and an outer circumference of the substantially continuous sewn helical fabric According to various embodiments, a transport mechanism may comprise a positively fed fiber bundle 150 using a unwinder 115 unit with automated tension control and carbon fiber spool 105, positive tow delivery mechanism 130 driven by servomotors to assist with positively feeding fiber bundle 150, a fiber bundle feeding chute 155, coordinated X and Y movements to lay down fiber bundles 150 at selected angles satisfying unique circular geometry of a targeted annular shaped textile. The fiber bundle 150 may be fed to the feeding chute 155 under controlled minimum tension, using the servomotors and positive tow delivery mechanism 130 as positive fiber bundle 150 drives. The tension of the fiber bundle 150 between the spool 105 and the positive tow delivery mechanism 130 may be controlled by an electronic unwinder 115 and speed sensor. This mode of transport delivers a flat fiber bundle 150 to the feeding chute 155. A fiber bundle 150 may be laid-down according to the selected fiber lay down pattern by coordinating the movements of the circular loom bed plate turntable 200 and the Y movement of the chute 155 fiber bundle 150 delivery assembly. Circumferential fiber orientation may be achieved (with brief reference to FIG. 3). Other orientations such as pure radial orientation may also be achieved. In various embodiments, air jets may be installed in between the spool and tow delivery system or in the feeding chute 155 to bulk the fiber bundle 150 and reduce its fiber volume. Fiber bundle 150 may be delivered/applied with a small amount of tension or with slack by controlling the circumferential speed of the tow delivery mechanism 130 and the speed of the X, Y movements of the circular loom bed plate turntable 200. The layers of delivered fiber bundle 150 may be secured via robotic sewing from the top of the fabric as described herein.

According to various embodiments, a process to manufacture, at high speed, a net shape preform, such as an annulus, with circumferential fibers and fibers oriented at selected angles from the annular preform radial directions is to lay down multiple layers of fiber tows in a controlled manner onto the bed plate of a circular loom bed plate turntable 200 and secure these layers using robotic sewing technology. This approach allows taking advantage of various methodologies put forward in U.S. Patent Application, entitled "System and Method for Textile Positioning" US2011/0275266A1 and filed on May 5, 2010 incorporated herein by reference, where transport of the fabric and of the preform being built on a smooth bed plate is realized by the inner and outer edges of the fabric, such as the unidirectional helical carbon fabric.

As noted above, existing reels, spools and other mechanisms may be used for storing and deploying spiral wound textiles, fiber bundles and/or carbon fiber tows. Although this disclosure illustrates and describes various embodiments, equivalents and modifications will occur to others who are skilled in the art upon reading and understanding of the disclosure.

Additionally, benefits, other advantages, and solutions to problems have been described herein with regard to various embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, and C" or "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the singular forms "a," "an," and "the" include plural referents unless the context clearly dictates otherwise. As used herein, the terms "for example," "for instance," "such as," or "including" are meant to introduce examples that further clarify more general subject matter. Unless otherwise specified, these examples are embodiments of the present disclosure, and are not meant to be limiting in any fashion.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A circular loom bed plate turntable system comprising:
a positive lay down delivery station;
a rotating table located adjacent to the positive lay down delivery station, wherein the rotating table comprises a plurality of pass-through grooves;
a robotic sewing head comprising a needle configured to pass through a first subset of the plurality of pass-through grooves; and
a fabric packaging station located adjacent to the rotating table, wherein the fabric packaging station is configured to remove a substantially continuous sewn helical fabric from the rotating table.

2. The circular loom bed plate turntable system of claim 1, further comprising a fiber bundle supply.

3. The circular loom bed plate turntable system of claim 2, further comprising an electronic unwinder coupled to the fiber bundle supply, wherein the fiber bundle supply is configured for positive fiber bundle lay down.

4. The circular loom bed plate turntable system of claim 3, further comprising a sensor coupled to the electronic unwinder, wherein the sensor is configured to control operation of the electronic unwinder.

5. The circular loom bed plate turntable system of claim 2, further comprising a manipulator coupled between the fiber bundle supply and the positive lay down delivery station, wherein the manipulator is configured to alter at least one of a fiber volume and an areal weight of a fiber bundle of the substantially continuous sewn helical fabric.

6. The circular loom bed plate turntable system of claim 5, wherein the manipulator comprises at least one of a spreader bar, a jet of compressed air, or an ultrasonic process.

7. The circular loom bed plate turntable system of claim 1, wherein the positive lay down delivery station is configured for positive lay down delivery, wherein the positive lay down delivery comprises pushing a fiber bundle to the positive lay down delivery station while imparting at least one of little and no tension on the fiber bundle.

8. The circular loom bed plate turntable system of claim 1, wherein the plurality of pass-through grooves in the rotating table are oriented in a sewing pattern.

9. The circular loom bed plate turntable system of claim 8, wherein the plurality of pass-through grooves in the rotating table are oriented in a zig-zag sewing pattern.

10. The circular loom bed plate turntable system of claim 1, wherein the robotic sewing head is configured to work from the top of the substantially continuous sewn helical fabric.

11. The circular loom bed plate turntable system of claim 1, wherein stitch lines of the robotic sewing head comprise noncontiguous radial stitch lines along an inner circumference and an outer circumference of the substantially continuous sewn helical fabric.

12. A circular loom bed comprising:
a positive lay down delivery station;
a first semi-circular conveying system;
a sewing zone comprising a robotic sewing head;
a second semi-circular conveying system; and
a fabric packaging station, wherein the fabric packaging station is configured to remove a substantially continuous sewn helical fabric from the circular loom bed.

13. The circular loom bed of claim 12, wherein at least one of the first semi-circular conveying system and the second semi-circular conveying system further comprises a semi-circular shaped conveying belt which partially covers a top and a bottom surface of the circular loom bed.

14. The circular loom bed of claim 13, wherein the sewing zone is disposed between the first semi-circular conveying system and the second semi-circular conveying system.

15. The circular loom bed of claim 12, wherein stitch lines are applied to loose fabric bundles in the sewing zone to form the substantially continuous sewn helical fabric, wherein stitch lines of the robotic sewing head comprise noncontiguous radial stitch lines along an inner circumference and an outer circumference of the substantially continuous sewn helical fabric.

* * * * *